United States Patent
Morris et al.

(10) Patent No.: US 6,600,619 B1
(45) Date of Patent: Jul. 29, 2003

(54) VIBRATION CONTROL OF PIEZOELECTRIC MICROACTUATOR

(75) Inventors: John C. Morris, Minneapolis, MN (US); Brian G. Molloy, Natick, MA (US); David A. Sluzewski, Edina, MN (US); John S. Wright, Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/475,362

(22) Filed: Dec. 30, 1999

Related U.S. Application Data

(60) Provisional application No. 60/121,147, filed on Feb. 22, 1999.

(51) Int. Cl.[7] .............................................. G11B 21/02
(52) U.S. Cl. ................... 360/75; 360/77.16; 360/78.05; 360/78.12
(58) Field of Search ............................... 360/78.05, 75, 360/77.16, 78.12

(56) References Cited

U.S. PATENT DOCUMENTS

| | | | | |
|---|---|---|---|---|
| 5,025,346 | A | 6/1991 | Tang et al. | 361/283 |
| 5,862,015 | A | * 1/1999 | Evans et al. | 360/104 |
| 5,959,808 | A | 9/1999 | Fan et al. | 360/106 |
| 6,005,742 | A | * 12/1999 | Cunningham et al. | 360/78.05 |
| 6,335,850 | B1 | * 1/2002 | Dunfield et al. | 360/294.5 |

FOREIGN PATENT DOCUMENTS

| WO | WO 98/44488 | 10/1998 |
|---|---|---|

OTHER PUBLICATIONS

"Modeling Piezoelectric Stack Actuators for Control of Micromanipulation", by M. Goldfarb et al., IEEE Control Systems, pp. 69–79, Jun. 1997.

"Precision Position Control of Piezoelectric Actuators Using Charge Feedback", by John A. Main, Journal of Guidance and Control and Dynamics, vol. 18, No. 5, pp. 1068–1073, Sep.–Oct., 1995.

"A Self-Sensing Piezoelectric Actuator for Collocated Control", by J. J. Dosch et al., J. of Intell. Mater. Syst. and Struct., vol. 3, pp. 166–185, Jan. 1992.

* cited by examiner

Primary Examiner—David Hudspeth
Assistant Examiner—Mitchell Slavitt
(74) Attorney, Agent, or Firm—Westman, Champlin & Kelly

(57) ABSTRACT

A system and method for controlling vibration of a piezoelectric microactuator in a disc drive are disclosed. The mechanical strain on the piezoelectric microactuator is ascertained and fed back to a controller which provides an electrical signal to the piezoelectric microactuator based upon the sensed strain. The electrical signal provided to the piezoelectric microactuator produces a mechanical force on the microactuator which counteracts the sensed strain. In one embodiment, a bridge circuit is coupled to the piezoelectric microactuator. The bridge circuit is adapted to sense a voltage across the piezoelectric microactuator and to separate the voltage across the piezoelectric microactuator into a voltage externally applied to the piezoelectric microactuator and a voltage induced on the piezoelectric microactuator by mechanical strain.

20 Claims, 7 Drawing Sheets

VIBRATION CONTROL OF PIEZOELECTRIC MICROACTUATOR

CROSS-REFERENCE TO RELATED APPLICATION

This application claims the benefit of U.S. Provisional Patent Application Ser. No. 60/121,147 entitled "VIBRATION CONTROL OF SELF-SENSING PIEZOELECTRIC MICROACTUATOR," filed on Feb. 22, 1999.

FIELD OF THE INVENTION

The present invention relates generally to disc drive data storage systems. More particularly, the present invention relates to controlling the vibration of a piezoelectric microactuator in a disc drive.

BACKGROUND OF THE INVENTION

A typical disc drive includes one or more magnetic discs mounted for rotation on a hub or spindle. A typical disc drive also includes one or more transducers supported by a hydrodynamic air bearing which flies above each magnetic disc. The transducers and the hydrodynamic air bearing are collectively referred to as a data head. A drive controller is conventionally used for controlling the disc drive system based on commands received from a host system. The drive controller controls the disc drive to retrieve information from the magnetic discs and to store information on the magnetic discs.

An electromechanical actuator operates within a negative feedback, closed-loop servo system. The actuator moves the data head radially over the disc surface for track seek operations and holds the transducer directly over a track on the disc surface for track following operations.

Information is typically stored on the magnetic discs by providing a write signal to the data head to encode flux reversals on the surface of the magnetic disc representing the data to be stored. In retrieving data from the disc, the drive controller controls the electromechanical actuator so that the data head flies above the magnetic disc, sensing the flux reversals on the magnetic disc, and generating a read signal based on those flux reversals. The read signal is then decoded by the drive controller to recover the data represented by flux reversals stored on a magnetic disc, and consequently represented in the read signal provided by the data head.

Accurate positioning of the data head over a track on the disc is of great importance in writing data to the disc and reading data from the disc.

In prior systems, servo operations were accomplished based on a dedicated servo head. In a dedicated servo type of system, servo information is all written to one dedicated surface of a disc in the disc drive. All of the heads in the disc drive are mechanically coupled to the servo head which is used to access the servo information. Thus, all of the heads in the dedicated servo disc drive are positioned based on the servo information read from the servo surface. This type of system allows the disc drive to conveniently execute parallel read and write operations. In other words, with appropriate circuitry in the drive controller, read and write operations can be executed in parallel using a plurality of the data heads mounted on the actuator, the data heads being simultaneously positioned based on the servo information read from the dedicated servo surface.

However, track densities on magnetic discs have been increasing for many years. Increased track densities on the magnetic disc require more accurate and higher resolution positioning. The mechanical offset between heads in a dedicated servo system can exceed one track width. Thus, the industry has seen a shift to embedded servo information in certain applications.

In an embedded servo system, servo information is embedded on each track on each surface of every disc. Thus, each data head returns a position signal independently of the other data heads. Therefore, the servo actuator is used to position each individual data head while that particular data head is accessing information on the disc surface. The positioning is accomplished using the embedded servo data for the track over which the data head is then flying.

Microactuated suspensions have been proposed in order to allow fine position control of the read/write head in an embedded servo system. A piezoelectric microactuator finely adjusts the position of a read/write head relative to a given track in response to a provided electrical signal. The usage of a piezoelectric microactuator will naturally result in additional resonances being introduced into the system. This will not present a serious problem when it is possible to sense and feedback the position of the read/write transducer and use the microactuator itself to compensate for the additional mechanical resonances. However, in certain models of disc drive operation it is either not possible to sense and feedback the read/write transducer position or the servo algorithm is not naturally a position error feedback system.

This problem presents itself when the disc drive is being track written. During the servo track writing operation, there is generally no measurement of the actual head position. Rather, the head position is inferred by measuring motion of some point on the actuator arm and assuming that the arm/suspension is a rigid body. The rigid body assumption does not hold true if the microactuator resonates, and if the microactuator does resonate then it will result in an increase in the written-in error on the servo tracks.

This problem also occurs during seek and settle operation of the disc drive. During seek the servo algorithm generally controls the velocity of the read/write transducer. In this mode it is critical that the suspension be very rigid so that "ringing" of the read/write transducer does not occur. The use of a microactuator results in a suspension that is less rigid than a suspension without a microactuator.

The present invention provides a solution to this and other problems and offers other advantages over the prior art.

SUMMARY OF THE INVENTION

The present invention relates to controlling the vibration of a piezoelectric microactuator in a disc drive.

One embodiment of the present invention is directed to a method for controlling vibration of a piezoelectric microactuator in a disc drive. The mechanical strain on the piezoelectric microactuator is sensed and an electrical signal is applied to the piezoelectric microactuator based on the sensed strain. Applying the electrical signal to the piezoelectric microactuator produces a mechanical force on the microactuator which counteracts the sensed strain.

In one embodiment, the strain on the piezoelectric microactuator is sensed by sensing a voltage across the piezoelectric microactuator and then separating the voltage across the piezoelectric microactuator into a voltage externally applied to the piezoelectric microactuator and a voltage induced on the piezoelectric microactuator by mechanical strain. An electrical signal is then applied to the piezoelectric microactuator based on the voltage induced on the piezoelectric microactuator.

Another embodiment of the present invention is directed to a disc drive including a disc, a head, a piezoelectric microactuator, a strain sensor and a controller. The disc is capable of storing data. The head is capable of being positioned adjacent the disc and of reading and writing data to the disc. The piezoelectric microactuator finely positions the head relative to the disc. The strain sensor is capable of sensing the mechanical strain on the piezoelectric microactuator and of producing a sensed strain signal that is indicative of the sensed strain. The controller is capable of receiving the sensed strain signal and applying an electrical signal to the piezoelectric microactuator based on the sensed strain. The electrical signal applied to the piezoelectric microactuator produces a mechanical force on the microactuator which counteracts the sensed strain.

In a further embodiment, the strain sensor includes a bridge circuit that is coupled to the piezoelectric microactuator. The bridge circuit is capable of sensing a voltage across the piezoelectric microactuator and of separating the voltage across the piezoelectric microactuator into a voltage externally applied to the piezoelectric microactuator and a voltage induced on the piezoelectric microactuator by mechanical strain.

These and various other features as well as advantages, which characterize the present invention, will be apparent upon reading of the following detailed description and review of the associated drawings.

DETAILED DESCRIPTION OF ILLUSTRATIVE EMBODIMENTS

Figure 1:
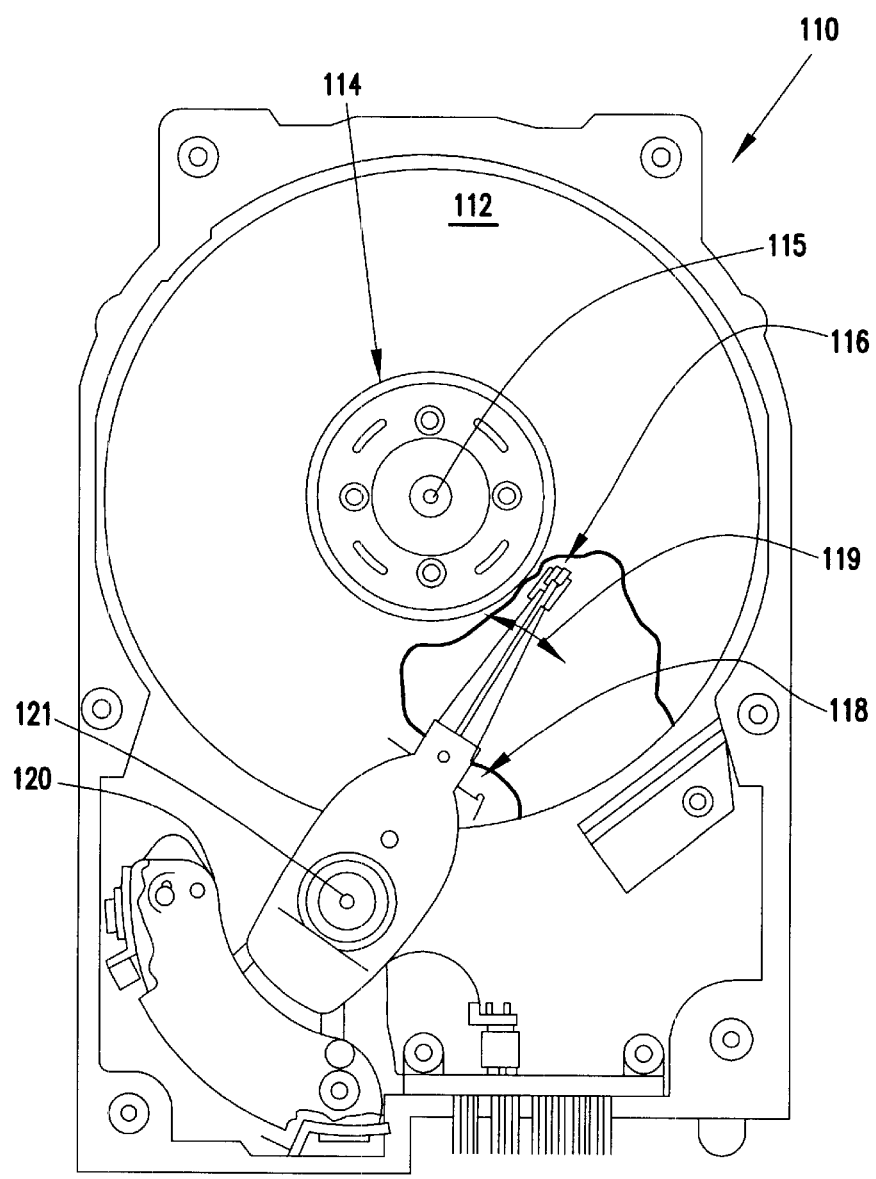
FIG. 1 illustrates a disc drive in accordance with one embodiment of the present invention.

FIG. 1 is a plan view of a typical disc drive 110. Disc drive 110 includes a disc pack 112, which is mounted on a spindle motor (not shown) by a disc clamp 114. Disc pack 112, in one preferred embodiment, includes a plurality of individual discs which are mounted for co-rotation about a central axis 115. Each disc surface on which data is stored has an associated head gimbal assembly (HGA) 116 which is mounted to an actuator assembly 118 in disc drive 110. The actuator assembly shown in FIG. 1 is of the type known as a rotary moving coil actuator and includes a voice coil motor (VCM) shown generally at 120. Voice coil motor 120 rotates actuator assembly 118 with its attached HGAs 116 about a pivot axis 121 to position HGAs 116 over desired data tracks on the associated disc surfaces, under the control of electronic circuitry housed within disc drive 110.

More specifically, actuator assembly 118 pivots about axis 121 to rotate head gimbal assemblies 116 generally along an arc 119 which causes each head gimbal assembly 116 to be positioned over a desired one of the tracks on the surfaces of discs in disc pack 112. HGAs 116 can be moved from tracks lying on the innermost radius, to tracks lying on the outermost radius of the discs. Each head gimbal assembly 116 has a gimbal, which resiliently supports a slider relative to a load beam so that the slider can follow the topography of the disc. The slider, in turn, includes a transducer, which is utilized for encoding flux reversals on, and reading flux reversals from, the surface of the disc over which it is flying.

Figure 2:
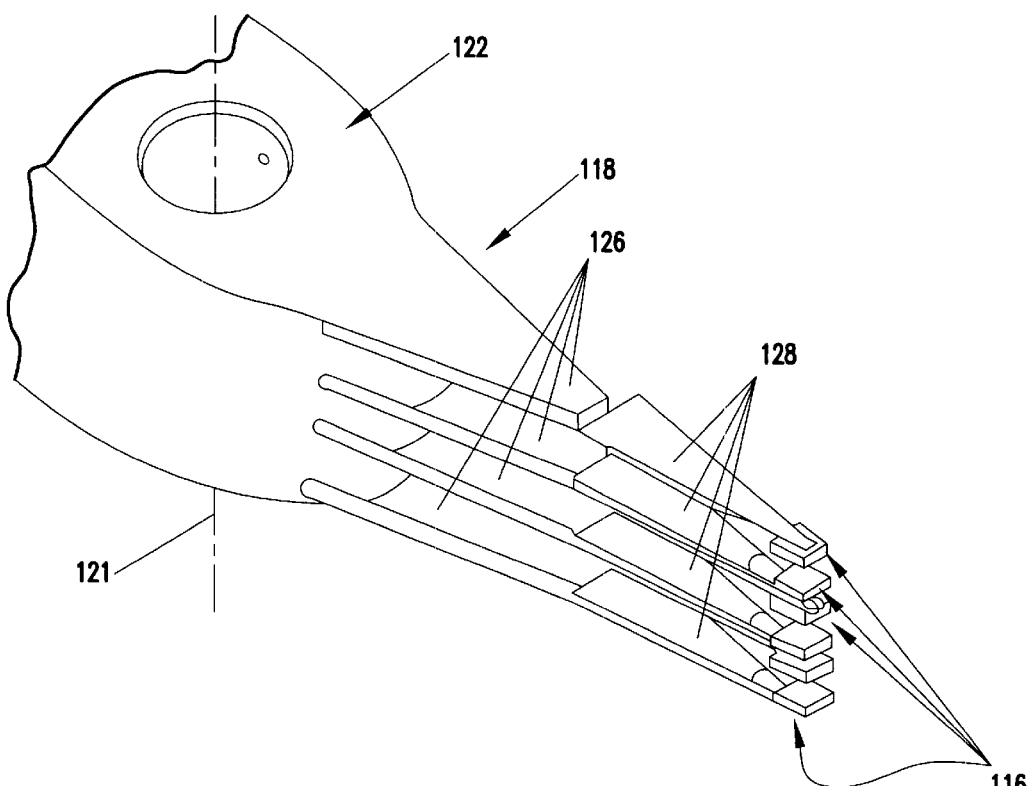
FIG. 2 illustrates an actuator assembly in accordance with one embodiment of the present invention.

FIG. 2 is a perspective view of actuator assembly 118. Actuator assembly 118 includes base portion 122, a plurality of actuator arms 126, a plurality of load beams 128, and a plurality of head gimbal assemblies 116. Base portion 122 includes a bore, which is, in the preferred embodiment, coupled for pivotal movement about axis 121. Actuator arms 126 extend from base portion 122 and are each coupled to the first end of either one or two load beams 128. Load beams 128 each have a second end which is coupled to a head gimbal assembly 116.

Figure 3:
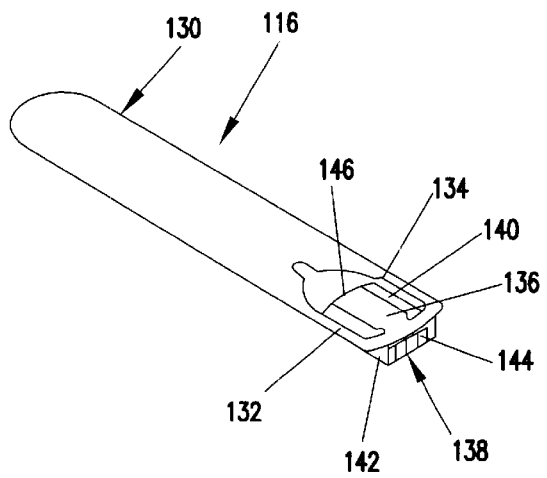
FIG. 3 illustrates a head gimbal assembly in accordance with one feature of the present invention.

FIG. 3 illustrates a greatly enlarged view of a head gimbal assembly 116. Head gimbal assembly 116 includes gimbal 130, which has a pair of struts 132 and 134, and a gimbal bond tongue 136. Head gimbal assembly 116 also includes slider 138 which has an upper surface 140 and a lower, air bearing surface 142. Transducers 144 are also preferably located on a leading edge of slider 138. The particular attachment between slider 138 and gimbal 130 is accomplished in any desired manner. Briefly, in one preferred embodiment, a compliant sheer layer is preferably coupled between the upper surface 140 of slider 138 and a lower surface of gimbal bond tongue 136, with an adhesive. The compliant sheer layer permits relative lateral motion between slider 138 and gimbal bond tongue 136. The compliant sheer layer is preferably a mylar film having a thickness of approximately 150 microns. Also, gimbal bond tongue 136 preferably terminates at a trailing edge of slider 138 with a mounting tab 146 which provides a surface at which slider 138 is attached to gimbal bond tongue 136.

Figure 4:
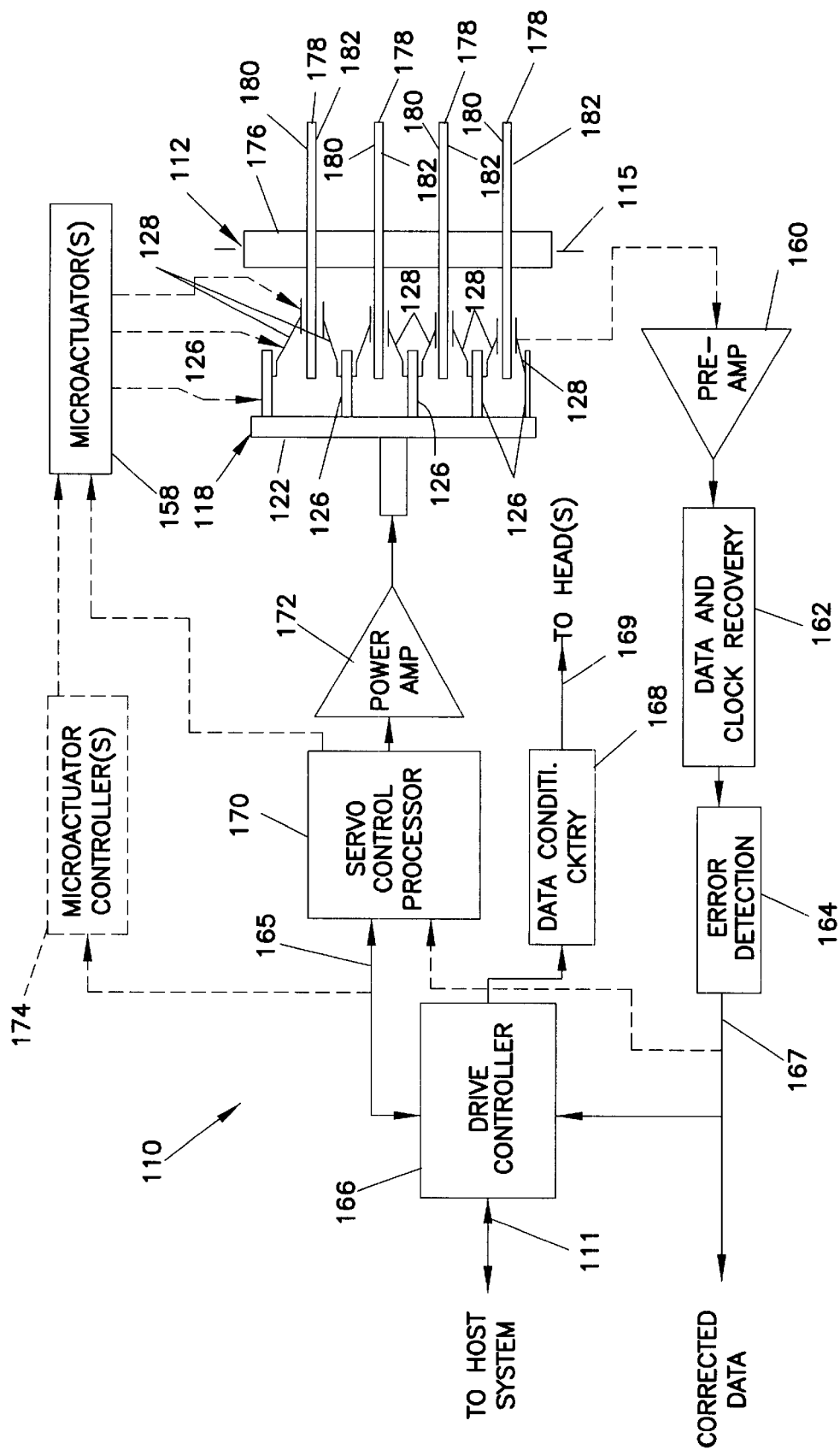
FIG. 4 is a block diagram of a portion of the disc drive in accordance with one embodiment of the present invention.

FIG. 4 is a block diagram of a portion of a disc drive 110, which illustrates a servo position control circuit in accordance with one aspect of the present invention. The portion of disc drive 110 which is illustrated in FIG. 4 includes actuator assembly 118, disc pack 112, piezoelectric microactuators associated with each head gimbal assembly (collectively referred to as piezoelectric microactuators 158), preamplifier 160, data and clock recovery circuit 162, error detection circuit 164, drive controller 166, data conditioning circuit 168, servo control processor 170, power amplifier 172, and optional microactuator controller(s) 174.

Drive controller 166 is preferably a microprocessor or digital computer, or other suitable microcontroller, and is coupled by bus 111 to a host system or another drive controller which controls the plurality of drives.

Disc pack 112 includes spindle 176 which supports a plurality of coaxially arranged discs 178. Each disc 178 is mounted for rotation with spindle 176 about axis of rotation 115. Each disc 178 has a first surface 180 and a second surface 182. Surfaces 180 and 182 include concentric tracks for receiving and storing data in the form of flux reversals encoded on the tracks.

As described with respect to FIGS. 2 and 3, actuator assembly 118 includes base portion 122 supporting the plurality of actuator arms 126. Each of the actuator arms 126 is coupled to at least one of the load beams 128. Load beams 128, in turn, each support one of the head gimbal assemblies 116 (labeled in FIG. 3) above corresponding disc surfaces 180 or 182 for accessing data within the tracks on the disc surface. Each gimbal assembly also includes at least one piezoelectric microactuator 158 for positioning the transducers on the head gimbal assemblies within a track, or on one of a plurality of different tracks, on disc 178. The piezoelectric microactuators 158 deform when subjected to a voltage, thereby slightly changing the position of their corresponding read/write heads. The degree of deformation is a function of the applied electrical signal.

In operation, drive controller 112 typically receives a command signal from a host system which indicates that a certain portion of one or more of discs 178 are to be accessed. In response to the command signal, drive controller 166 provides servo control processor 170 with a position (or reference) signal 165 which indicates a particular cylinder over which actuator assembly 118 is to position head gimbal assemblies 116. Servo control processor 170 converts the position signal into an analog signal which is amplified by power amplifier 172 and is provided to the voice coil motor in actuator assembly 118. In response to the analog position signal, actuator assembly 118 positions load beams 128 and their associated head gimbal assemblies 116 over a desired cylinder.

The head gimbal assemblies 116 generate a read signal containing data from embedded servo position data which is stored on a selected portion of each track of the disc to be read, as well as normal data to be accessed from the selected portion of the disc to be read. The read signal is provided to preamplifier 160 which amplifies the read signal and provides it to data and clock recovery circuit 162. Data and clock recovery circuit 162 recovers data from the read signal, which is encoded on the disc surface when the data is written to the disc surface, in a known manner. Of course, data and clock recovery circuit 162 can be a PRML channel, or another suitable type of read channel.

Once the data is recovered, it is provided to error detection circuit 164 which detects whether any errors have occurred in the data read back from the disc and which provides an output 167. Errors are corrected by error detection circuit 164 or drive controller 166, or a combination of both, in a known manner.

During head positioning, drive controller 166 provides a position signal to servo control processor 170 causing actuator assembly 118 to position head gimbal assemblies 116 over a selected cylinder. In a sector, or embedded, servo positioning drive, a portion of each sector on the disc surfaces has position information which is encoded thereon and which is read by the data head and provided, through the read channel, to servo control processor 170. The positioning information not only gives coarse position information indicating the particular track over which the data head is flying, it also provides tuning feedback to the servo control processor for better positioning. Servo control processor 170 reacts to the position information read from the disc and positions the head gimbal assemblies 116 accordingly.

In an illustrative embodiment, servo control processor 170 is used to not only control the coarse actuator (voice coil motor) but it is also used to control the piezoelectric microactuators 158. In another illustrative embodiment, a separate microactuator controller (or plurality of separate microactuator controllers) 174 are provided for controlling the microactuators 158 in response to the position request signal from drive controller 166 and also in response to the embedded position information read from the discs.

In order to write information to the discs, drive controller 166 receives not only the location of the information to be written on disc pack 112, but also receives the actual data to be written. The location information is provided to servo control processor 170 (and optionally microactuator controller(s) 174) as a reference signal to coarsely position the data heads relative to the corresponding disc surfaces. Then, drive controller 166 provides the data to be written to data conditioning circuitry 168, which in turn provides that information at an output 169 to the particular transducers on the head gimbal assemblies 116 so that the data can be written to the disc surfaces, in a known manner.

In an illustrative embodiment, piezoelectric microactuators 158 have a range of motion which is in excess of the worst case mechanical misalignment between any two of the head assemblies 116 supported by actuator assembly 118. In a preferred embodiment, each microactuator 158 has a range of motion which is in excess of one track width, and even more preferably in excess of a plurality, of track widths. Also, in an illustrative embodiment, the read channel provided in disc drive 110 (which in the embodiment shown in FIG. 4 includes preamp 160, data and clock recovery circuit 162 and error detection circuit 164) is capable of receiving a plurality of simultaneous and parallel data signals and processing those data signals in parallel, and providing them to the host system, and/or drive controller 166 in parallel. Further, data conditioning circuitry 168 is also preferably suitable for providing a plurality of simultaneous and parallel write signals to the data heads to execute a simultaneous and parallel write operation. Further, in a preferred embodiment, servo controller processor 170 and optional microactuator controller(s) 174 are suitable for simultaneously providing positioning signals to microactuators 158 to simultaneously position all, or at least a plurality of, the microactuators so that a plurality of heads can be simultaneously aligned with tracks on a plurality of disc surfaces in disc pack 112.

Figure 5:
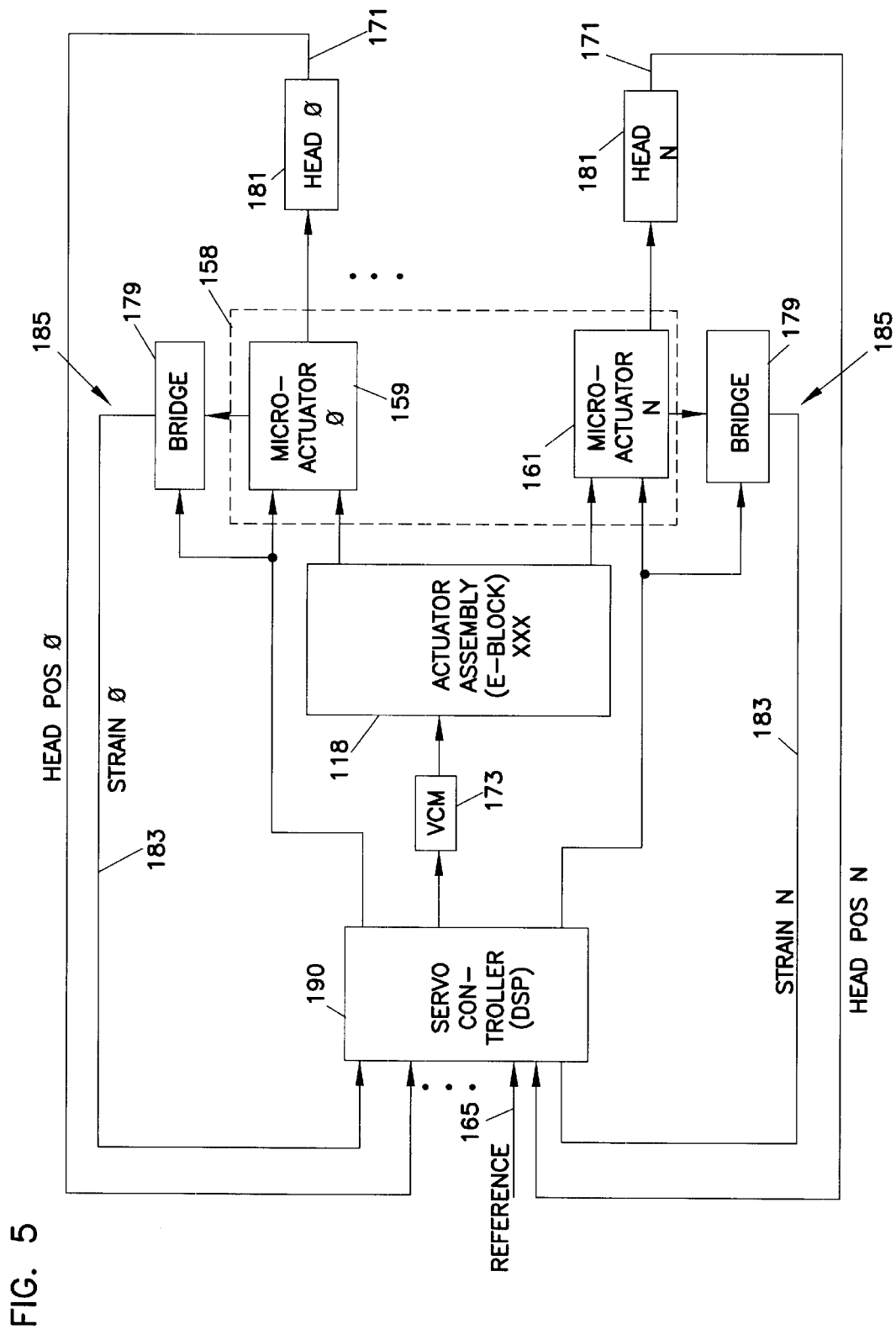
FIG. 5 is a block diagram of a portion of a servo control circuit in accordance with one embodiment of the present invention.

FIG. 5 illustrates an embodiment in which servo control processor 170 and microactuator controller 174 are combined into a single servo controller 190. Servo controller 190 receives as its inputs a reference signal 165 from the host system or disc drive controller 166, along with head position signals for each of the heads 181 (head 0–head N) which is indicative of the position of the head. An output from servo controller 190 is provided to voice coil motor (VCM) 173 which drives actuator assembly (or E-block) 118. FIG. 5 also illustrates that servo controller 190 provides output signals to all of the piezoelectric microactuators 158 (microactuator 0–microactuator N also represented by designation numerals 159–161) coupled to actuator assembly 118. The inputs to servo controller 190 also thus include head position signals 171 from the relevant heads. In an illustrative embodiment, servo controller 190 also receives relative position signals indicative of the relative position of each of the heads with respect to VCM 173. For clarity's sake, the relative position signals are not shown in FIG. 5. Each of the microactuators is shown coupled to a head 181. Thus, it can be seen that servo controller 190 provides the coarse positioning signal to voice coil motor 173 for positioning the entire actuator assembly 118. Servo controller 190 also provides the fine positioning signals to microactuators 158.

According to an illustrative embodiment of the present invention, each microactuator 159, 161 has an associated strain sensor 179. Strain sensor 179 senses the mechanical strain on its associated piezoelectric microactuator 158 and produces a sensed strain signal 183 indicative of the sensed strain. The sensed strain signal 183 is provided to servo controller 190. Servo controller 190 produces an electrical signal based on the sensed strain and provides it to the corresponding microactuator 158. This electrical signal applied to the piezoelectric microactuator 158 produces a mechanical force which counteracts the sensed strain.

In an illustrative embodiment of the present invention, servo controller 190 calculates the magnitude of this electrical signal applied to the piezoelectric microactuator to maintain the strain energy in the suspension at a level as close to zero as possible. This mode of operation is illustratively employed at times when the control objective is not positioning of the read/write head, such as during seeking and during servo track writing. In an alternative embodiment of the present invention, the sensed strain signal is used to improve positioning of the read/write head relative to a data track that the head is following. In this alternative embodiment, servo controller 190 calculates the magnitude of the electrical signal applied to the piezoelectric microactuator to maintain the position error of the read/write head at a level as close to zero as possible.

In an illustrative embodiment, the electrical signal provided by servo controller 190 to piezoelectric microactuator 158 is a voltage signal, though it may also be a current signal or a charge signal. The sensed strain signal 183 fed into servo controller 190 can be at the same sample rate as head position signal 171 or it can be at a different sample than head position signal 171. Together, microactuator 158, strain sensor 179, sensed strain signal 183 and servo controller 190 make up strain-regulation loop 185.

In an illustrative embodiment, strain sensor 179 measures a voltage induced on the piezoelectric microactuator 158 by mechanical strain and produces sensed strain signal 183 based on the induced voltage. In a further illustrative embodiment, strain sensor 179 is a bridge circuit adapted to sense the voltage across the piezoelectric microactuator 158 and to separate the voltage into components comprising a voltage externally applied to the piezoelectric microactuator 158, i.e., to control the degree of actuation, and a voltage induced on the piezoelectric microactuator 158 by mechanical inputs, such as vibration. In an illustrative embodiment, this voltage induced on the piezoelectric microactuator by mechanical strain is then provided to the servo controller 190 as the sensed strain signal 183. The servo controller 190 then applies a voltage signal to the piezoelectric microactuator 158 based on this sensed induced voltage. In an illustrative embodiment, the voltage signal applied to the piezoelectric microactuator by servo controller 190 is equal in magnitude and of opposite polarity to the sensed induced voltage. However, in an alternative embodiment, the sensed strain signal 183 is filtered to improve feedback performance and stability, as will be explained below. It is to be understood that strain sensor 179 may alternatively sense the mechanical strain on the piezoelectric microactuator 158 as a function of electrical charge or current as opposed to voltage.

The sensed strain on the piezoelectric device 158 will include both the static and dynamic strain on the device resulting from its mechanical interface to the suspension. In order to reduce the amplitude of the oscillation that occurs when the microactuator resonances are excited, in an illustrative embodiment, the sensed strain signal 183 comprises the dynamic strain on the piezoelectric device. In an illustrative embodiment, a high-pass filter (not shown) is coupled to the output of the bridge circuit 179. The high-pass filter removes frequencies from the sensed strain signal 183 which are lower than a prescribed value. In this way, frequencies which are not of concern can be ignored. For example, when the mechanical strain which is desired to be alleviated is strain from resonant vibration, DC strain signals can be ignored. Alternatively, other types of filters (low-pass, bandpass) can be used on the sensed strain signal 183 to remove frequencies which are not of concern.

Figure 6:
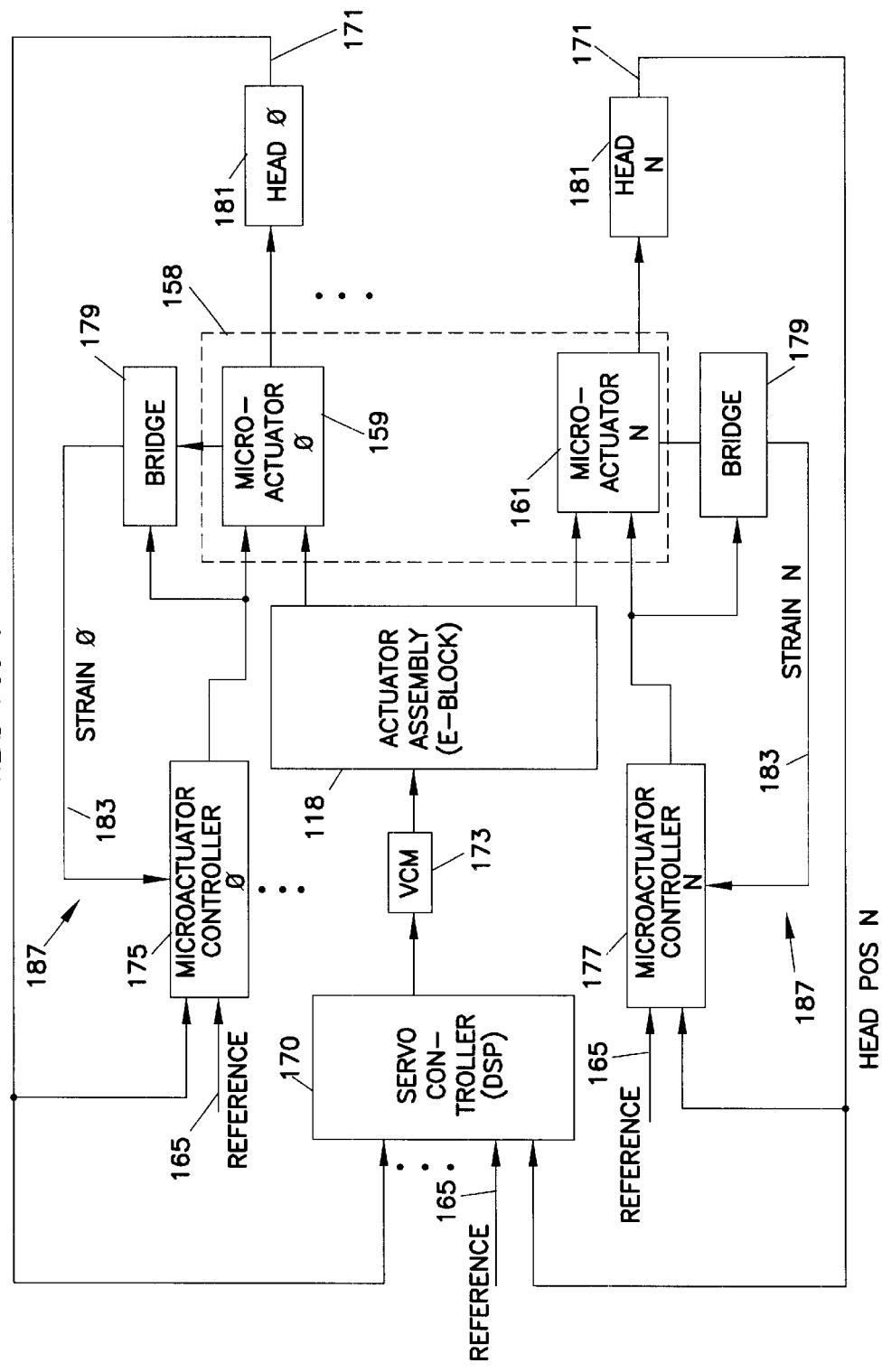
FIG. 6 is a block diagram of a portion of a servo control circuit in accordance with one embodiment of the present invention.

The strain-regulation loop of the present invention can also be employed in a servo system in which each piezoelectric microactuator 159, 161 has an associated microactuator controller 175, 177 as shown in FIG. 6. This is in contrast to the system described above with respect to FIG. 5, wherein all of the microactuators are controlled by the servo controller 190.

FIG. 6 illustrates that servo control processor 170 receives as its inputs the head positions 171 for all of the heads (head 0–head N) as well as a reference signal 165 from the host system or disc drive controller 166. The output of the servo control processor 170 is directed to the voice coil motor 173 which drives actuator assembly (or E-block) 118. FIG. 6 also illustrates individual microactuator controllers (0–N) 175, 177 for each of the microactuators (0–N) 158, coupled to the actuator assembly 118. The inputs to each of the microactuator controllers 175 includes the head position 171 from the relevant head as well as reference signal 165. Each microactuator 159,161 has an associated strain sensor 179. Strain sensor 179 senses the mechanical strain on its associated piezoelectric microactuator 159, 161 and produces a sensed strain signal 183 indicative of the sensed strain. The sensed strain signal 183 is provided to the corresponding microactuator controller 175, 177. The microactuator controller 175, 177 then produces an electrical signal based on the sensed strain and provides it to the corresponding microactuator 159,161. Together, microactuator 159, 161, strain sensor 179, sensed strain signal 183 and microactuator controller 175, 177 make up a strain-regulation loop 187.

In an illustrative embodiment of the present invention, the strain-regulation loop is employed in a track-writing system. During the servo track writing operation, there is generally no measurement of the actual head position. Rather, the head position is inferred by measuring motion of some point on the actuator arm 126 and assuming that the arm/suspension is a rigid body. The rigid body assumption does not hold true if the microactuator resonates, which commonly occurs as a result of air-flow excitation. If the microactuator does resonate then it will result in an increase in the written-in error on the servo tracks. Therefore, in this embodiment, the sensed strain is used as feedback to regulate the strain as close to zero as possible. In a preferred embodiment, the strain-regulation loops 185, 187 of all the microactuators run concurrently during the track-writing process. This will support regulation of the strain on the microactuators while mounted in a track writer operating in single or gang-write mode. The strain-regulation loops 185, 187 serve to dynamically stiffen the microactuator suspension. That is, they minimize the excitation of resonant frequencies and attenuate resonant frequencies when they are excited, thereby reducing the unobservable cross-track motion of the suspension.

In another illustrative embodiment of the present invention, the strain-regulation loop is employed during seek and settle operation of the disc drive.

During seek the servo algorithm generally controls the rigid body velocity of the entire actuator assembly 122. In this mode it is critical that the suspension be very rigid so that ringing of the read/write transducer 144 does not occur. The use of a microactuator results in a suspension that is less rigid than a suspension without a microactuator. Therefore, in this embodiment, the strain-regulation loop 185, 187 is employed to dynamically stiffen the microactuator suspension during seek or seek settle. In an illustrative embodiment, this process is performed with respect to the selected microactuator, thereby substantially preventing the suspension from oscillating during seek deceleration and settle, potentially allowing the use of faster, more aggressive seek profiles. Alternatively, all microactuators can be strain-regulated concurrently in order to reduce the acoustic emissions that often occur during aggressive seeking.

In yet another illustrative embodiment of the present invention, the strain-regulation loop is employed during track-follow operation of the disc drive. This provides further input to the servo algorithm in addition to the position error signal, potentially resulting in an increase in the performance and accuracy of the servo system.

Figure 7:
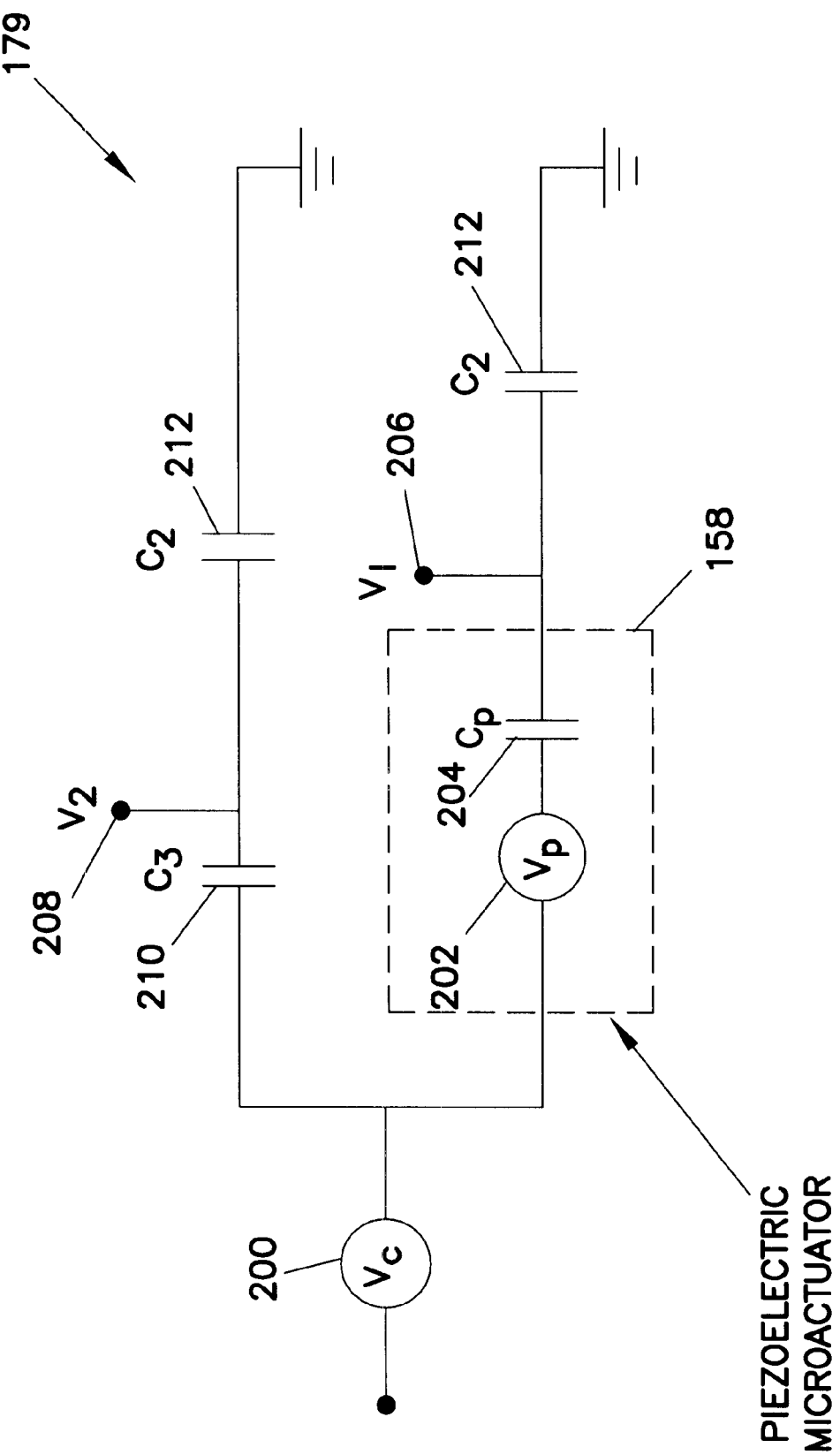
FIG. 7 is a schematic diagram of a bridge circuit in accordance with one embodiment of the present invention.

In an illustrative embodiment, strain sensor 179 is comprised of a bridge circuit. The bridge circuit 179 subtracts the electrical signal due to the applied control voltage from the piezoelectric microactuator's total output signal, leaving only the signal resulting from the piezoelectric strain. Such a bridge circuit is described in "A Self-Sensing Piezoelectric Actuator for Collocated Control," Jeffrey J. Dosch, Daniel J. Inman, Ephrahim Garcia, J. of Intell. Mater. Syst. and Struct., Vol. 3, Jan. 1992, and is shown in FIG. 7 of this application. The voltage $v_c$ 200 is the voltage from the controller (servo controller 190 or microactuator controller 175) applied to the piezoelectric microactuator 158. Piezoelectric microactuator 158 is modeled as a voltage $v_p$ 202 and a capacitance $C_p$ 204. The voltage $v_p$ 202 is the voltage produced by the piezoelectric material as it strains and the capacitor $C_p$ 204 is the capacitance of the piezoelectric microactuator 158 measured at constant strain. The purpose of bridge circuit 179 is to determine $v_p$ 202. Output voltage $v_1$ 206 is composed of signals due to two sources: the voltage $v_c$ 200 from the controller and the voltage $v_p$ due to the strain of the piezoelectric material 158. The signal at $v_2$ 208 is due to a single voltage source: the voltage generator $v_c$ 200. To eliminate the effects due to $v_c$ 200, $v_2$ is subtracted from $v_1$, resulting in what will be referred to as the sensor voltage $v_s$. If the capacitance of $C_3$ 210 is chosen to equal the capacitance of the piezoelectric material $C_p$, an expression for the sensor voltage in terms of Laplace Transform variables is:

$$V_s(s) = V_1(s) - V_2(s) = \frac{C_p}{C_p + C_2} V_p(s) \quad \text{EQ. 1}$$

where $V_s(s)$ is the sensor voltage in the Laplace domain and the two capacitors indicated as $C_2$ 212 have the same capacitance.

Figure 8:
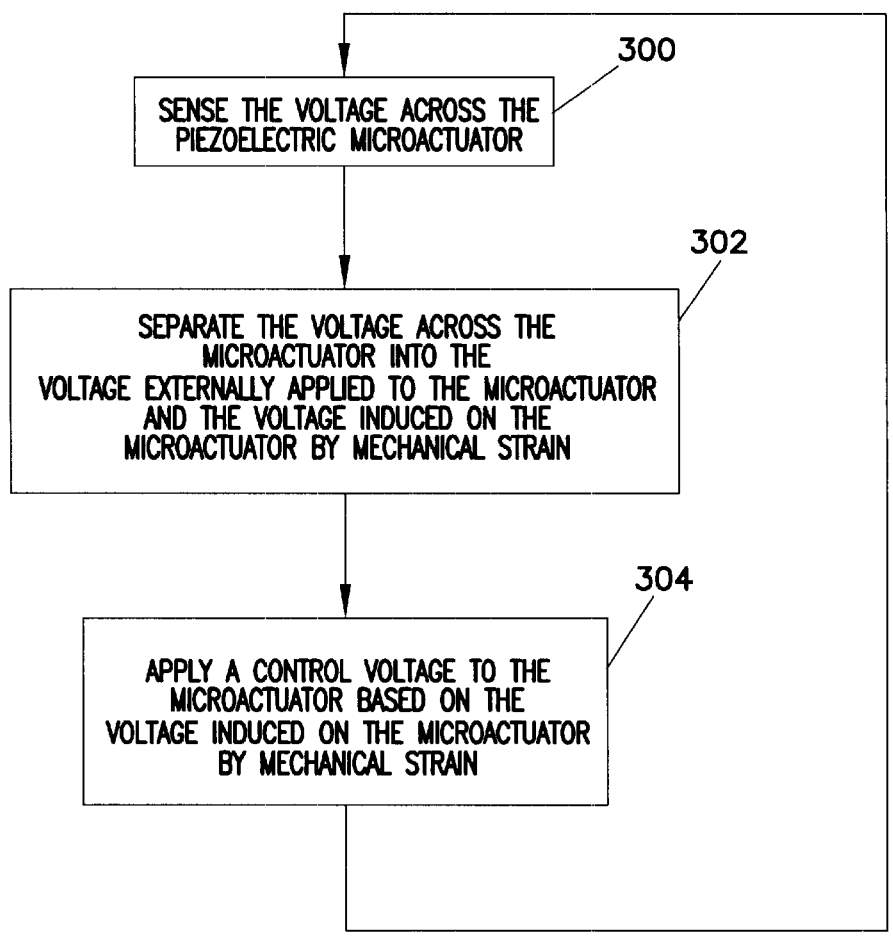
FIG. 8 is a flowchart representing a method of controlling vibration of a piezoelectric microactuator in accordance with one embodiment of the present invention.

The flowchart of FIG. 8 represents a method of controlling vibration of a piezoelectric microactuator 158 in a disc drive 110 according to an illustrative embodiment of the present invention. First, the voltage across the piezoelectric microactuator 158 is sensed, as shown in block 300. At block 302, the sensed voltage across the microactuator 158 is separated into the control voltage applied to the microactuator 158 and the voltage induced on the microactuator 158 by mechanical strain. At block 304, a control voltage is applied to the microactuator 158 based on the voltage induced on the microactuator 185 by mechanical strain. The control voltage applied to the microactuator 158 is calculated to counteract the mechanical strain on the microactuator 158 as represented by the voltage induced on the microactuator 158. Applying the control voltage to the piezoelectric microactuator 158 produces a force on the microactuator 158 which substantially counteracts the sensed strain on the microactuator 158. This process is illustratively repeated continuously in a strain-regulation loop 185, 187 in order to minimize the vibration of the microactuator 158. It will be understood that the electrical signal provided by the controller to the piezoelectric microactuator 158 can also be a charge or current signal rather than a voltage signal. Also, it is to be understood that strain sensor 179 may sense the mechanical strain on the piezoelectric microactuator 158 as a function of electrical charge or current as opposed to voltage.

In summary, one embodiment of the present invention is directed to a method for controlling vibration of a piezoelectric microactuator 158 in a disc drive 110. The mechanical strain on the piezoelectric microactuator 158 is sensed and an electrical signal is applied to the piezoelectric microactuator 158 based on the sensed strain. Applying the electrical signal to the piezoelectric microactuator 158 produces a mechanical force on the microactuator 158 which counteracts the sensed strain.

In one embodiment, the strain on the piezoelectric microactuator 158 is sensed by sensing a voltage across the piezoelectric microactuator 158 and then separating the voltage across the piezoelectric microactuator 158 into a voltage externally applied to the piezoelectric microactuator 158 and a voltage induced on the piezoelectric microactuator 158 by mechanical strain. An electrical signal is then applied to the piezoelectric microactuator 158 based on the voltage induced on the piezoelectric microactuator 158.

Another embodiment of the present invention is directed to a disc drive 110 including a disc 112, a head 116, a piezoelectric microactuator 158, a strain sensor 179 and a controller 190, 175. The disc 110 is capable of storing data. The head 116 is capable of being positioned adjacent the disc 110 and of reading and writing data to the disc 110. The piezoelectric microactuator 158 finely positions the head 116 relative to the disc 110. The strain sensor 179 is capable of sensing the mechanical strain on the piezoelectric microactuator 158 and of producing a sensed strain signal that is indicative of the sensed strain. The controller 190, 175 is capable of receiving the sensed strain signal and applying an electrical signal to the piezoelectric microactuator 158 based on the sensed strain. The electrical signal applied to the piezoelectric microactuator 158 produces a mechanical force on the microactuator 158 which counteracts the sensed strain.

In a further embodiment, the strain sensor 179 includes a bridge circuit that is coupled to the piezoelectric microactuator 158. The bridge circuit 179 is capable of sensing a voltage across the piezoelectric microactuator 158 and of separating the voltage across the piezoelectric microactuator 158 into a voltage externally applied to the piezoelectric microactuator 158 and a voltage induced on the piezoelectric microactuator 158 by mechanical strain.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, the electrical signal provided by the controller 175, 190 to the piezoelectric microactuator 158 in order to counteract the strain on the microactuator 158 may be a charge signal or a current signal as opposed to a voltage signal, without departing from the scope and spirit of the present invention. Other modifications can also be made.

What is claimed is:

1. A method for controlling vibration of a piezoelectric microactuator in a disc drive, the piezoelectric microactuator adapted to finely position a read/write head relative to a track on a disc, the method comprising steps of:
   (a) sensing the mechanical strain on the piezoelectric microactuator; and
   (b) applying an electrical signal to the piezoelectric microactuator based on the sensed strain, whereby applying the electrical signal to the piezoelectric microactuator produces a mechanical force on the microactuator which at least reduces the sensed strain.

2. The method of claim 1 wherein the sensing step (a) comprises measuring a voltage induced on the piezoelectric microactuator by mechanical strain and wherein the applying step (b) comprises applying an electrical signal to the piezoelectric microactuator based on the voltage induced on the piezoelectric microactuator.

3. The method of claim 1 Wherein sensing step (a) further comprises steps of:
   (a)(i) sensing a voltage across the piezoelectric microactuator; and
   (a)(ii) separating the voltage across the piezoelectric microactuator into components comprising a voltage externally applied to the piezoelectric microactuator and a voltage induced on the piezoelectric microactuator by mechanical strain.

4. The method of claim 1 wherein the sensing step (a) includes sensing the mechanical strain directly from the microactuator.

5. The method of claim 1 wherein the disc drive comprises a plurality of heads and a plurality of piezoelectric microactuators and wherein the method is performed while one or more heads are writing a servo track to the disc and wherein sensing step (a) and applying step (b) are performed with respect to the plurality of piezoelectric microactuators concurrently, thereby reducing mechanical resonance of the plurality of piezoelectric microactuators.

6. The method of claim 1 wherein the method is performed while the head is involved with at least one of a group including seeking a selected track on the disc and following a selected track on the disc.

7. The method of claim 1 wherein the mechanical force on the microactuator counteracts the sensed strain.

8. The method of claim 1 further comprising a step (c) of repeating sensing step (a) and applying step (b) a plurality of times.

9. The method of claim 1 wherein applying step (b) further comprises calculating a magnitude of the electrical signal such that applying the electrical signal to the piezoelectric microactuator produces a mechanical force on the microactuator which minimizes the mechanical strain on the microactuator.

10. A disc drive comprising:
    a disc adapted to store data;
    a head adapted to be positioned adjacent the disc and adapted to read and write data to the disc;
    a piezoelectric microactuator adapted to finely position the head relative to the disc;
    a strain sensor adapted to sense the mechanical strain on the piezoelectric microactuator and to produce a sensed strain signal indicative of the sensed strain; and
    a controller adapted to receive the sensed strain signal and to apply an electrical signal to the piezoelectric microactuator based on the sensed strain whereby the electrical signal applied to the piezoelectric microactuator produces a mechanical force on the microactuator which at least reduces the sensed strain.

11. The disc drive of claim 10 wherein the strain sensor is adapted to measure a voltage induced on the piezoelectric microactuator by mechanical strain and to produce a sensed strain signal indicative of the sensed strain based on the measured induced voltage.

12. The disc drive of claim 10 wherein the strain sensor comprises a bridge circuit coupled to the piezoelectric microactuator and adapted to sense a voltage across the piezoelectric microactuator.

13. The disc drive of claim 10 wherein the strain sensor is adapted to separate a voltage across the piezoelectric microactuator into components comprising a voltage externally applied to the piezoelectric microactuator and a voltage induced on the piezoelectric microactuator by mechanical strain.

14. The disc drive of claim 10 comprising:
    a plurality of heads adapted to be positioned adjacent the disc and adapted to read and write data to the disc;
    a plurality of piezoelectric microactuators, each adapted to finely position one of the plurality of heads relative to the disc; and
    a plurality of strain sensors, each adapted to sense the mechanical strain on one of the piezoelectric microactuators and to produce a sensed strain signal indicative of the sensed strain, wherein the controller comprises a plurality of microactuator controllers, each adapted to receive the sensed strain signal produced by one of the plurality of strain sensors and to apply an electrical signal to the corresponding piezoelectric microactuator based on the sensed strain.

15. The disc drive of claim 10 comprising:
    a plurality of heads adapted to be positioned adjacent the disc and adapted to read and write data to the disc;
    a plurality of piezoelectric microactuators, each adapted to finely position one of the plurality of heads relative to the disc; and
    a plurality of strain sensors, each adapted to sense the mechanical strain on one of the piezoelectric microactuators and to produce a sensed strain signal indicative of the sensed strain, wherein the controller is a multiple-input, multiple output servo controller adapted to receive the sensed strain signals produced by each of the plurality of strain sensors and to apply an electrical signal to each of the piezoelectric microactuators based on the sensed strain on the corresponding piezoelectric microactuator.

16. The disc drive of claim 10 further comprising a filter coupled to the strain sensor and adapted to remove frequencies from the sensed strain signal which are not within a prescribed range.

17. The disc drive of claim 16 wherein the filter is a high-pass filter adapted to remove frequencies from the sensed strain signal which are lower than a prescribed value.

18. The disc drive of claim 10 wherein the controller comprises a servo controller which is adapted to provide a first control signal to a voice coil motor to coarsely position the head relative to the disc and adapted to provide a second control signal to the piezoelectric microactuator to finely position the head relative to the disc.

19. The disc drive of claim 10 wherein the controller comprises a microactuator controller which is adapted to provide a control signal to the piezoelectric microactuator to finely position the head relative to the disc.

20. A disc drive comprising:
    a piezoelectric microactuator adapted to finely position a head relative to a disc; and
    means for reducing the mechanical strain on the piezoelectric microactuator.

* * * * *

UNITED STATES PATENT AND TRADEMARK OFFICE
CERTIFICATE OF CORRECTION

PATENT NO.     : 6,600,619 B1
DATED          : July 29, 2003
INVENTOR(S)    : Morris et al.

It is certified that error appears in the above-identified patent and that said Letters Patent is hereby corrected as shown below:

Column 11,
Line 18, change "Wherein" to -- wherein --.
Line 62, after "strain" add -- , --.

Signed and Sealed this

Sixteenth Day of December, 2003

JAMES E. ROGAN
*Director of the United States Patent and Trademark Office*